United States Patent
Lin et al.

(10) Patent No.: US 8,491,176 B2
(45) Date of Patent: Jul. 23, 2013

(54) LIGHT GUIDE PLATE AND LIGHT SOURCE APPARATUS

(75) Inventors: Sheng-Hung Lin, Hsin-Chu (TW);
Jung-Min Hwang, Hsin-Chu (TW);
Udo Custodis, Hsin-Chu (TW);
Shih-Yuan Yu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 408 days.

(21) Appl. No.: 12/963,639

(22) Filed: Dec. 9, 2010

(65) Prior Publication Data
US 2011/0228561 A1    Sep. 22, 2011

(30) Foreign Application Priority Data

Mar. 18, 2010 (TW) .............................. 99108051 A (51) Int. Cl.
*G02B 6/10* (2006.01)
(52) U.S. Cl.
USPC ............ 362/626; 362/330; 362/559; 362/800
(58) Field of Classification Search
USPC ................ 362/511, 330, 555, 551, 559, 621, 362/625, 623, 626, 627
See application file for complete search history.

(56) References Cited

U.S. PATENT DOCUMENTS

| | | | |
|---|---|---|---|
| 4,105,293 A | | 8/1978 | Aizenberg et al. |
| 4,345,815 A | * | 8/1982 | Righini et al. .................. 385/14 |
| 7,025,482 B2 | | 4/2006 | Yamashita et al. |
| 7,478,942 B2 | * | 1/2009 | Kim et al. ..................... 362/620 |
| 7,559,681 B2 | * | 7/2009 | Suehiro et al. ................ 362/558 |
| 2004/0096182 A1 | | 5/2004 | Yamashita et al. |
| 2005/0237765 A1 | * | 10/2005 | Suehiro et al. ................ 362/611 |
| 2006/0050200 A1 | * | 3/2006 | Nagao ............................. 349/65 |
| 2008/0266878 A1 | * | 10/2008 | Chang .......................... 362/309 |
| 2010/0080007 A1 | * | 4/2010 | Chuang ........................ 362/330 |

FOREIGN PATENT DOCUMENTS

| | | |
|---|---|---|
| JP | 2000251514 | 9/2000 |
| JP | 2001236810 | 8/2001 |
| JP | 2002-075037 | 3/2002 |

(Continued)

OTHER PUBLICATIONS

"Office Action of Japan Counterpart Application", with English translation thereof, issued on Aug. 28, 2012, p. 1-p. 9.

(Continued)

*Primary Examiner* — Jong-Suk (James) Lee
*Assistant Examiner* — Leah S Macchiarolo
(74) *Attorney, Agent, or Firm* — Jianq Chyun IP Office (57) ABSTRACT

A light guide plate (LGP) includes a first surface, a second surface, and a plurality of light incident surfaces. The first surface is a light-emitting surface. The light incident surfaces connect the first surface and the second surface. The second surface has a plurality of ring-shaped grooves. Depths of the ring-shaped grooves are gradually decreased from a place close to a center of the LGP towards places close to the light incident surfaces. Each of the ring-shaped grooves has a first ring-shaped side wall surface and a second ring-shaped side wall surface. The second ring-shaped side wall surface is opposite to the first ring-shaped side wall surface and located between a geometry center of the ring-shaped groove and the first ring-shaped side wall surface. The first ring-shaped side wall surface is a tilted surface. In addition, a light source apparatus is also provided.

20 Claims, 6 Drawing Sheets

FOREIGN PATENT DOCUMENTS

| | | |
|---|---|---|
| JP | 2004200128 | 7/2004 |
| TW | 509605 | 11/2002 |
| TW | M243656 | 9/2004 |
| TW | 1241441 | 10/2005 |
| WO | 2010014570 | 2/2010 |

OTHER PUBLICATIONS

"Office Action of Japan Counterpart Application", issued on Mar. 19, 2013, with English translation thereof, pp. 1-4, in which the listed reference was cited.

* cited by examiner

LIGHT GUIDE PLATE AND LIGHT SOURCE APPARATUS

CROSS-REFERENCE TO RELATED APPLICATION

This application claims the priority benefit of Taiwan application serial no. 99108051, filed on Mar. 18, 2010. The entirety the above-mentioned patent application is hereby incorporated by reference herein and made a part of specification.

BACKGROUND OF THE INVENTION

1. Field of the Invention

The invention generally relates to an optical component and a light source apparatus, and more particularly, to a light guide plate (LGP) and a light source apparatus adopting the LGP.

2. Description of Related Art

A side type light source module usually includes an LGP, wherein the LGP functions to guide the scattering direction of a light beam produced by a light source so as to ensure the uniformity of the luminance of the light-emitting surface and convert a point light source or a line light source into a planar light source. In general speaking, an LGP includes a plurality of micro-structures to destroy total internal reflection (TIR) so as to make the LGP provide a uniform surface light source at the light-emitting surface. As a result, the LGP may emit light uniformly by the design of micro-structures.

Since the radiation pattern of emitting-light of most LGPs is unable to be effectively controlled and most ones of them are emitting-light with half floodlight radiation pattern, so that a glare is caused in the lighting apparatus application, and the glare makes the user have uncomfortable sense. In addition, although a few of current LGPs have light-controlling effect, however only the emitting angles in two directions of a light source may be controlled, but it fails to completely control the emitting angles of the light source.

Taiwan Patent No. M243656 discloses an LGP, wherein an array of concentric circle grooves are disposed on the light-emitting surface of the LGP. Taiwan Patent No. I241441 discloses an LGP, wherein the bottom surface of the LGP includes a plurality of V-shaped grooves and the height of a top portion of the V-shaped grooves is increased with an increasing distance between a V-shaped groove and the light incident surfaces.

U.S. Pat. No. 7,025,482 discloses an illumination device, wherein the surface of the light guide component has a plurality of concentric circle grooves. Taiwan Patent No. 509605 discloses a micro-forming cutter capable of cutting a concentric circle 3-D structure on a work piece to be processed. US Patent Application Publication No. 20060050200 discloses a prism plate, wherein the surface thereof has a ring-shaped prism composed of a plurality of concentric circle grooves. U.S. Pat. No. 4,105,293 discloses a light source base with guiding light, and the light source base includes an LGP with a circle light-emitting surface and a plurality of light sources surrounding the LGP.

SUMMARY OF THE INVENTION

Accordingly, the invention is directed to an LGP with good light-concentrating effect.

The invention is also directed to a light source apparatus able to provide illumination with good light-concentrating effect.

Other advantages of the invention should be further indicated by the disclosures of the invention, and omitted herein for simplicity.

To achieve one of, a part of or all of the above-mentioned advantages, or to achieve other advantages, an embodiment of the invention provides an LGP including a first surface, a second surface, and a plurality of light incident surfaces. The second surface is opposite to the first surface, wherein the first surface is a light-emitting surface. The light incident surfaces connect the first surface and the second surface. The second surface has a plurality of ring-shaped grooves. Depths of the above-mentioned ring-shaped grooves are gradually decreased from a place close to a center of the LGP towards places close to the light incident surfaces. Each of the ring-shaped grooves has a first ring-shaped side wall surface and a second ring-shaped side wall surface. The first ring-shaped side wall surface and the second ring-shaped side wall surface are opposite to each other. The second ring-shaped side wall surface is located between a geometry center of the ring-shaped groove and the first ring-shaped side wall surface. The first ring-shaped side wall surface is a tilted surface, and an included angle between a normal vector of the first ring-shaped side wall surface and a normal vector of the first surface is greater than 90°.

In addition, another embodiment of the invention also provides a light source apparatus including the above-mentioned LGP and a plurality of light-emitting units, wherein the light-emitting units are respectively disposed beside the light incident surfaces, and each of the light-emitting units is capable of emitting a light beam. The light beams are capable of entering the LGP through the corresponding light incident surfaces and being transmitted out of the light source apparatus through the first surface.

The embodiments of the invention may have at least one of the following advantages or effects. In the embodiments of the invention, since the LGP has a plurality of light incident surfaces and a plurality of ring-shaped grooves, the emitting angle of the light beam may be effectively controlled so as to provide good light-converging effect.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In the patent specification, the normal vector of a surface of an object is defined as the vector of the surface, wherein the vector is perpendicular to the surface and pointed from the inside of the object towards the outside of the object.

The First Embodiment

Figure 1A:
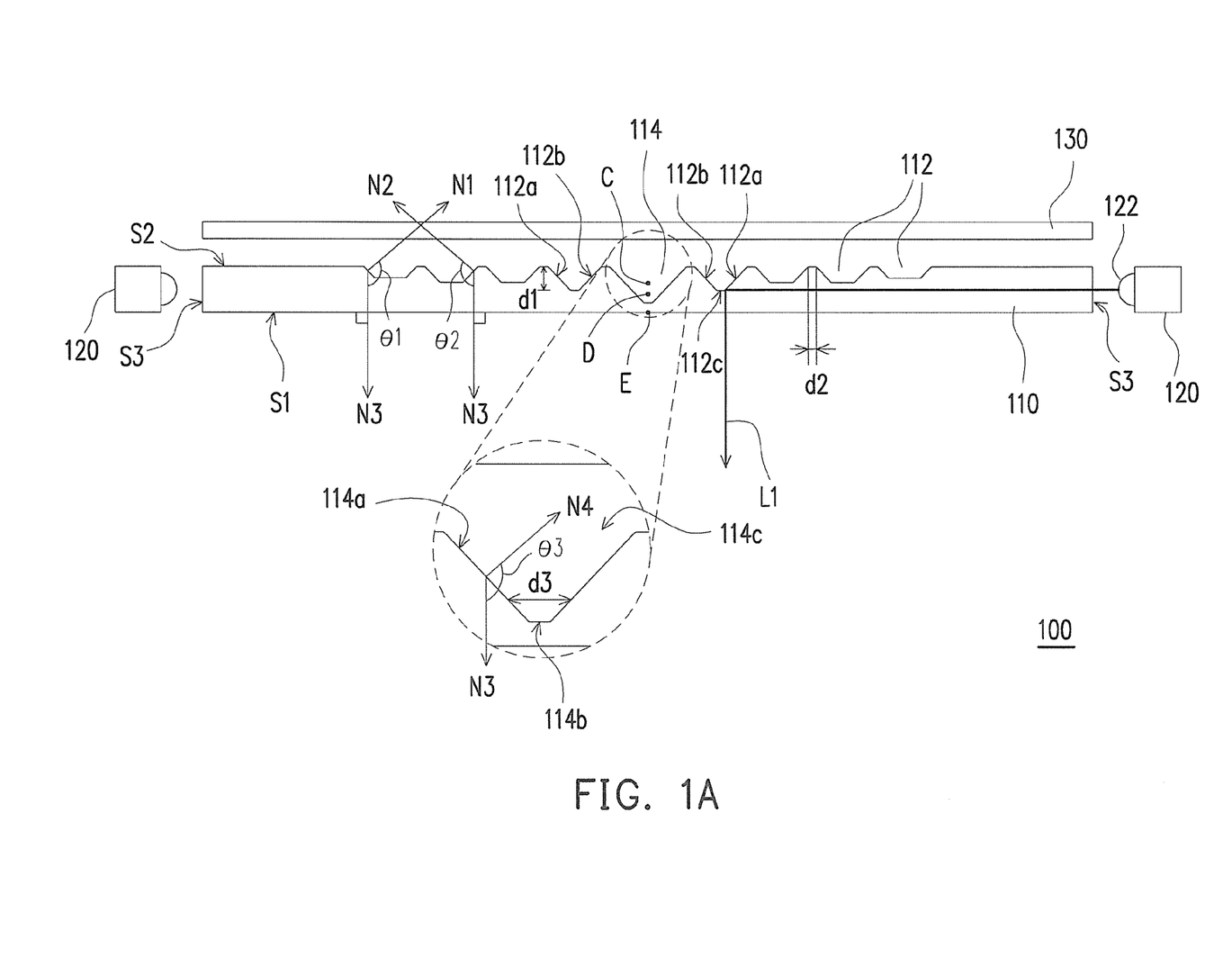
FIG. 1A is a sectional diagram of a light source apparatus according to the first embodiment of the invention.
Figure 1B:
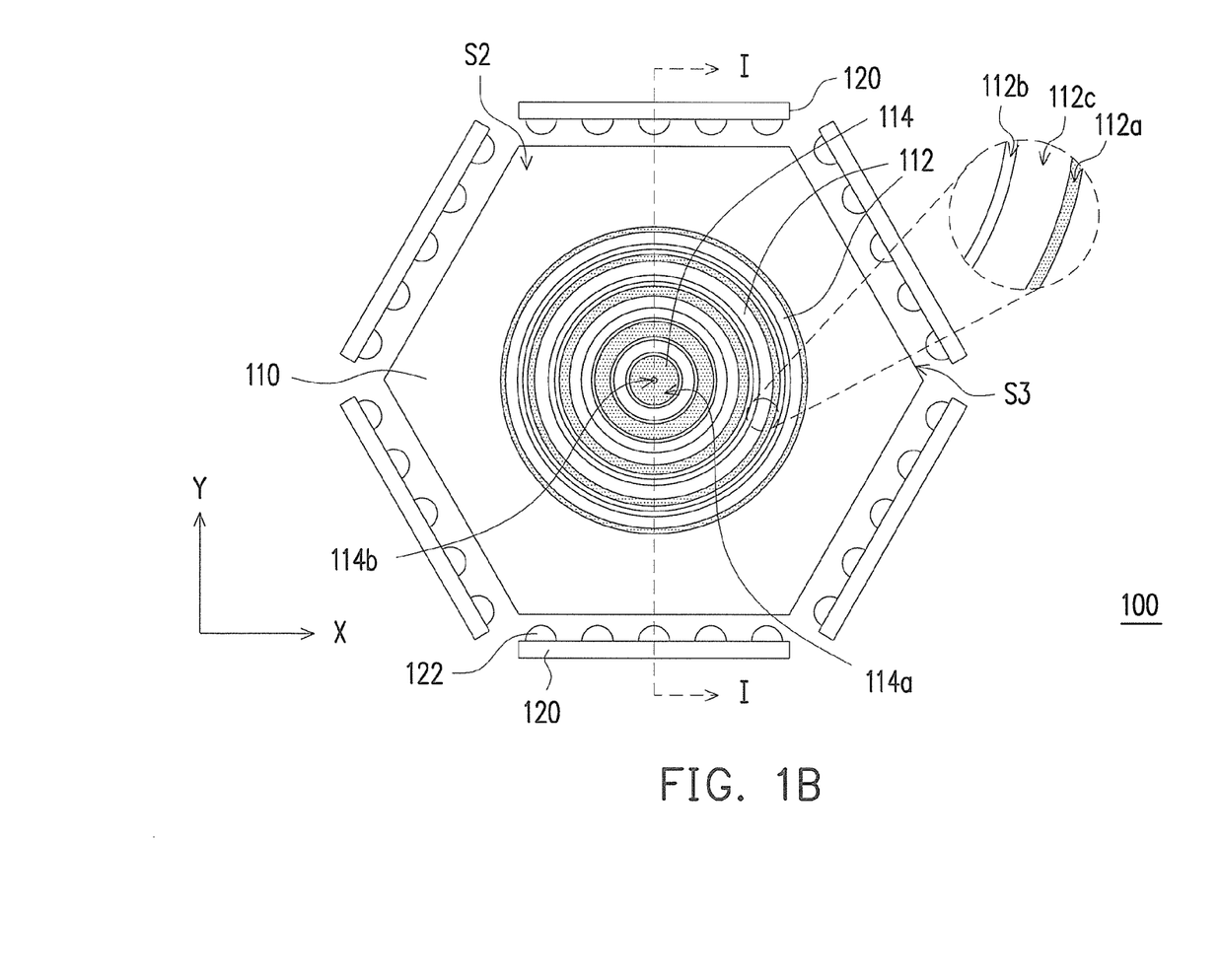
FIG. 1B is a top view diagram of the light source apparatus of FIG. 1A after removing the reflection sheet thereof.

FIG. 1A is a sectional diagram of a light source apparatus according to the first embodiment of the invention and FIG. 1B is a top view diagram of the light source apparatus of FIG. 1A after removing the reflection sheet thereof, wherein FIG. 1A is a sectional diagram of FIG. 1B along I-I line. Referring to FIGS. 1A and 1B, a light source apparatus 100 includes an LGP 110 and a plurality of light-emitting units 120. The LGP 110 includes a first surface S1, a second surface S2, and a plurality of light incident surfaces S3. The second surface S2 is opposite to the first surface S1, wherein the first surface S1 is a light-emitting surface. The light incident surfaces S3 are connected to the first surface S1 and the second surface S2.

The light-emitting units 120 are respectively disposed beside the light incident surfaces S3, wherein each of the light-emitting units 120 is capable of emitting a light beam L1. The light beams L1 are capable of entering the LGP 110 through the light incident surfaces S3 and being transmitted out of the light source apparatus 100 through the first surface S1. The light-emitting units 120 include, for example, a plurality of light emitting diodes (LEDs) 122. As shown by FIG. 1B, the LGP 110 of the embodiment has a shape of, for example, hexagon so as to provide six light incident surfaces S3. In other embodiments however, the LGP 110 may be circle or any other polygon with greater than or equal to three edges.

Referring to FIGS. 1A and 1B, the second surface S2 has a plurality of ring-shaped grooves 112, wherein the depths d1 of the ring-shaped grooves 112 are gradually decreased from a place close to a center of the LGP 110 towards places close to the light incident surfaces S3, and are respectively, for example, 5 millimeters (mm), 3 mm, 2 mm, 1.5 mm, and 1 mm. In addition, each of the ring-shaped grooves 112 has a first ring-shaped side wall surface 112a and a second ring-shaped side wall surface 112b, wherein the first ring-shaped side wall surface 112a and the second ring-shaped side wall surface 112b are opposite to each other. The second ring-shaped side wall surface 112b is located between a geometry center C of the ring-shaped groove 112 and the first ring-shaped side wall surface 112a. By using the above-mentioned design that the depths d1 of the ring-shaped grooves 112 are gradually decreased from the place close to the center of the LGP 110 towards the places close to the light incident surfaces S3, it is helpful to make the light beam L1 be transmitted to the center of the LGP 110 from the light incident surfaces S3, i.e., a part of the light beam L1 would firstly reach the first ring-shaped side wall surface 112a of a ring-shaped groove 112 with a less depth and then is reflected to the first surface S1 for light-emitting, and the rest part of the light beam L1 keeps travel forwards until reaching the first ring-shaped side wall surface 112a of the next ring-shaped grooves 112 with deeper depths for being reflected to emit light, which is advantageous to reduce the cases that the light beam L1 strikes the tilted surface to directly emit light, and moreover, it is able to increase the light-emitting luminance of the light beam L1 at the place close to the center of the LGP 110.

As shown by FIG. 1A, the first ring-shaped side wall surface 112a is a tilted surface, and an included angle θ1 between a normal vector N1 of the first ring-shaped side wall surface 112a and a normal vector N3 of the first surface S1 is greater than 90°. In this way, the light beams L1 provided by the light-emitting units 120 are capable of being reflected by the first ring-shaped side wall surface 112a and transmitted to the outside of the LGP 110. Besides, the light source apparatus 100 of the embodiment further includes a reflection sheet 130 disposed on the second surface S2 and capable of reflecting the light beam L1 so that the light beam L1 is transmitted to the outside of the LGP 110.

On the other hand, an included angle θ2 between a normal vector N2 of the second ring-shaped side wall surface 112b and the normal vector N3 of the first surface S1 is greater than 90°, but in other embodiments, the included angle θ2 may be 90°. In addition, in the embodiment, the included angle between the normal vector N2 of the second ring-shaped side wall surface 112b and the normal vector N1 of the first ring-shaped side wall surface 112a is greater than 0° and less than 180°. That is to say, in the embodiment, the first ring-shaped side wall surface 112a is not parallel to the second ring-shaped side wall surface 112b. The ring-shaped groove 112 further has a ring-shaped bottom surface 112c, wherein the ring-shaped bottom surface 112c connects the first ring-shaped side wall surface 112a and the second ring-shaped side wall surface 112b. As shown by FIG. 1A, the ring-shaped groove 112 is, for example, a groove with a section of trapezoid. The ring-shaped bottom surface 112c is helpful to make the light beam L1 transmitted forwards so as to reduce the cases that the light beam L1 strikes the tilted surface to directly emit light, and moreover, it is able to increase the light-emitting luminance of the light beam L1 at the place close to the center of the LGP 110. Besides, the ring-shaped groove 112 of the embodiment is a circle ring and an interval d2 is between two adjacent ring-shaped grooves 112, the interval d2 is respectively 0.5 mm. The interval d2 may increase the transmission distance of the light beam L1 and make the light beam L1 easier for total internal reflection (TIR) inside the LGP 110. In other embodiments, there is no interval between the adjacent ring-shaped grooves 112, i.e., the interval d2 is equal to zero.

The second surface S2 further has a cavity 114, the cavity 114 is surrounded by every ring-shaped groove 112, and the cavity 114 has a ring-shaped side wall surface 114a, wherein the ring-shaped side wall surface 114a is a tilted surface. As shown by FIG. 1A, an included angle θ3 between a normal vector N4 of the ring-shaped side wall surface 114a and the normal vector N3 of the first surface S1 is greater than 90°. Similarly, the normal vector N4 is defined as the vector perpendicular to the ring-shaped side wall surface 114a and pointed from the inside of the LGP 110 towards outside of the LGP 110. The cavity 114 may also have a bottom surface 114b, the bottom surface 114b is located at the place of a geometry center C of each of the ring-shaped grooves 112 and connected to the ring-shaped side wall surface 114a. The orthogonal projections E of the geometry center C of each of the ring-shaped grooves 112 and a geometry center D of the cavity 114 on the first surface S1 are coincided with each other. In the embodiment, the cavity 114 is, for example, a rod-shaped cavity, and the inner diameter d3 of the cavity 114 is increased from the bottom surface 114b of the cavity 114 towards the top portion 114c of the cavity 114.

Continuing to FIGS. 1A and 1B, in the embodiment, in addition to that the depths d1 of the ring-shaped grooves 112 are increased from the places close to the light incident surfaces S3 towards the place close to the center of the LGP 110, the included angles θ1 between the normal vectors N1 of the first ring-shaped side wall surfaces 112a and the normal vector N3 of the first surface S1 are also decreased from the places close to the light incident surfaces S3 towards the place close to the center of the light guide plate 110. In the embodiment, the included angles θ1 are respectively, for example, 140°, 135° and 130°, from left to right, while the included angle θ3 between the normal vector N4 and the normal vector N3 is equal to or less than 130°. By means of that the depth d1 is increased towards the center of the LGP 110 and the included angle θ1 is decreased towards the center of the LGP 110, the light-concentrating effect of the LGP 110 is advanced and the bright region caused by the light beam L1 at the light incident surfaces S3 is reduced. Since the light source apparatus 100 uses multiple-sides light incidence and the ring-shaped grooves 112 are arranged in concentric circles, the light-concentrating effect of the LGP 110 almost reaches the effect of 360°, which is different from the traditional light-concentrating in bi-directions.

Figure 2:
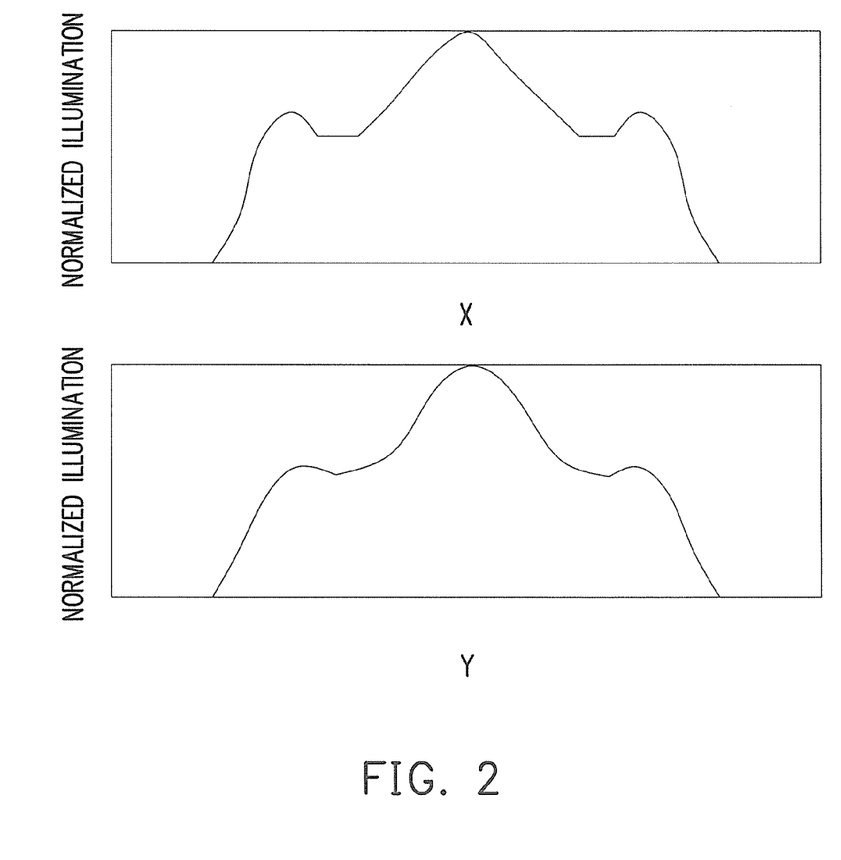
FIG. 2 is a normalized illumination curve graph in X direction and Y direction of an LGP.
Figure 3:
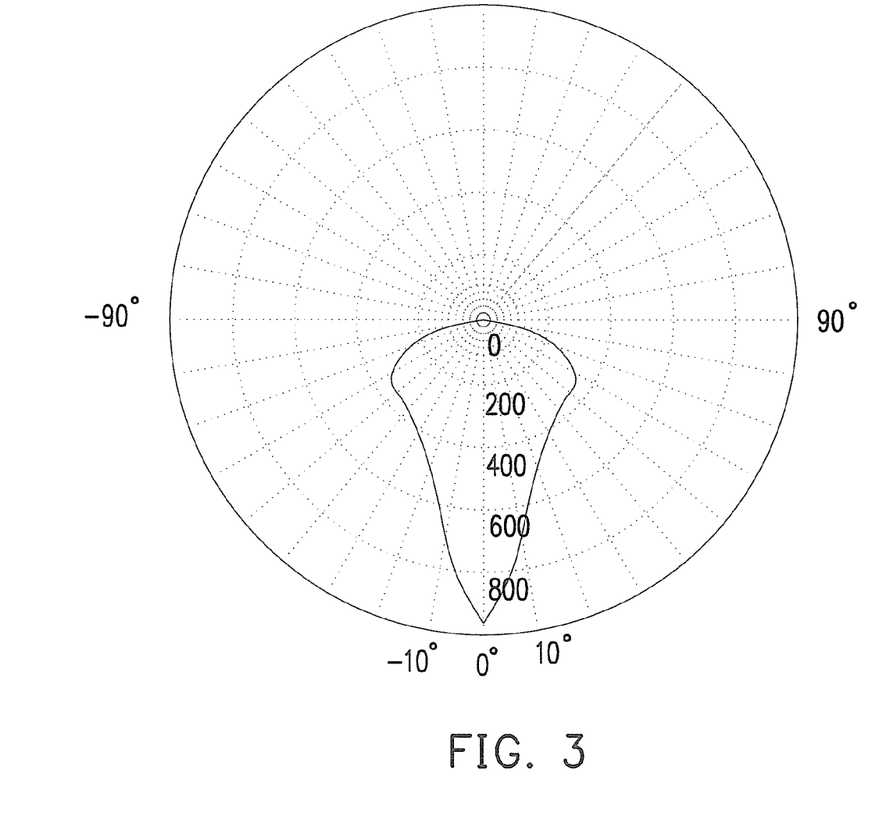
FIG. 3 is a light source angle curve graph of the above-mentioned LGP.

FIG. 2 is a normalized illumination curve graph in X direction and Y direction of the LGP 100 and FIG. 3 is a light source angle curve graph of the above-mentioned LGP 100. The radial coordinate in FIG. 3 represents light intensity and the unit thereof may be an arbitrary unit. In the embodiment, since the ring-shaped grooves 112 of the LGP 110 are fabricated at places behind the light incident surfaces S3 by a certain distance (for example, 20 mm), so that the TIR of the light beam L1 during travelling in the LGP 110 is destroyed and then output after 20 mm. As a result, as shown by FIG. 2, the emitting-light intensity of the LGP 110 is increased with the increasing distance between the light-emitting surface S1 and the light incident surface S3, which makes the light have higher emitting-light intensity at the place close to the center of the LGP 100. In addition, as shown by FIG. 3, by means of the above-mentioned structure design, the LGP 110 of the embodiment may also control the emitting angle of the light beam L1 within 30° roughly so as to provide a surface light source with light-concentrating effect and breaks through the limit of the traditional LGP where the light-concentrating occurs only in two dimensions.

The Second Embodiment

Figure 4:
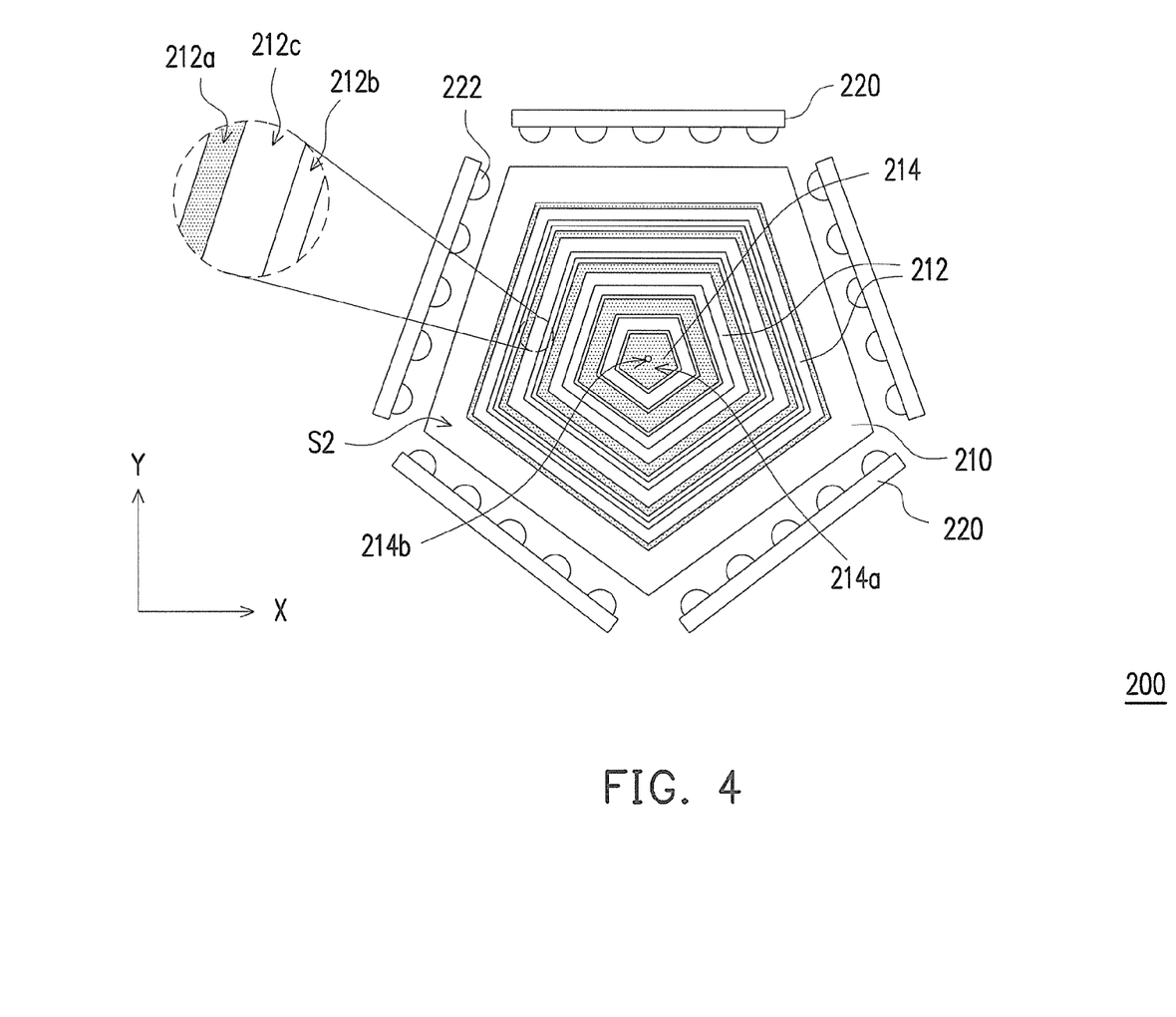
FIG. 4 is a top view diagram of a light source apparatus according to the second embodiment of the invention.

FIG. 4 is a top view diagram of a light source apparatus 200 according to the second embodiment of the invention. The light source apparatus 200 is similar to the light source apparatus 100 of FIG. 1B except that the ring-shaped groove 212 of the light source apparatus 200 is a polygon ring, for example, a pentagon ring. In addition, the shape of the LGP 210 may be designed as a pentagon LGP in association with the shape of the ring-shaped groove 212. Other depiction and modification related to the light source apparatus 200 may refer the first embodiment, which is omitted to describe.

The Third Embodiment

Figure 5:
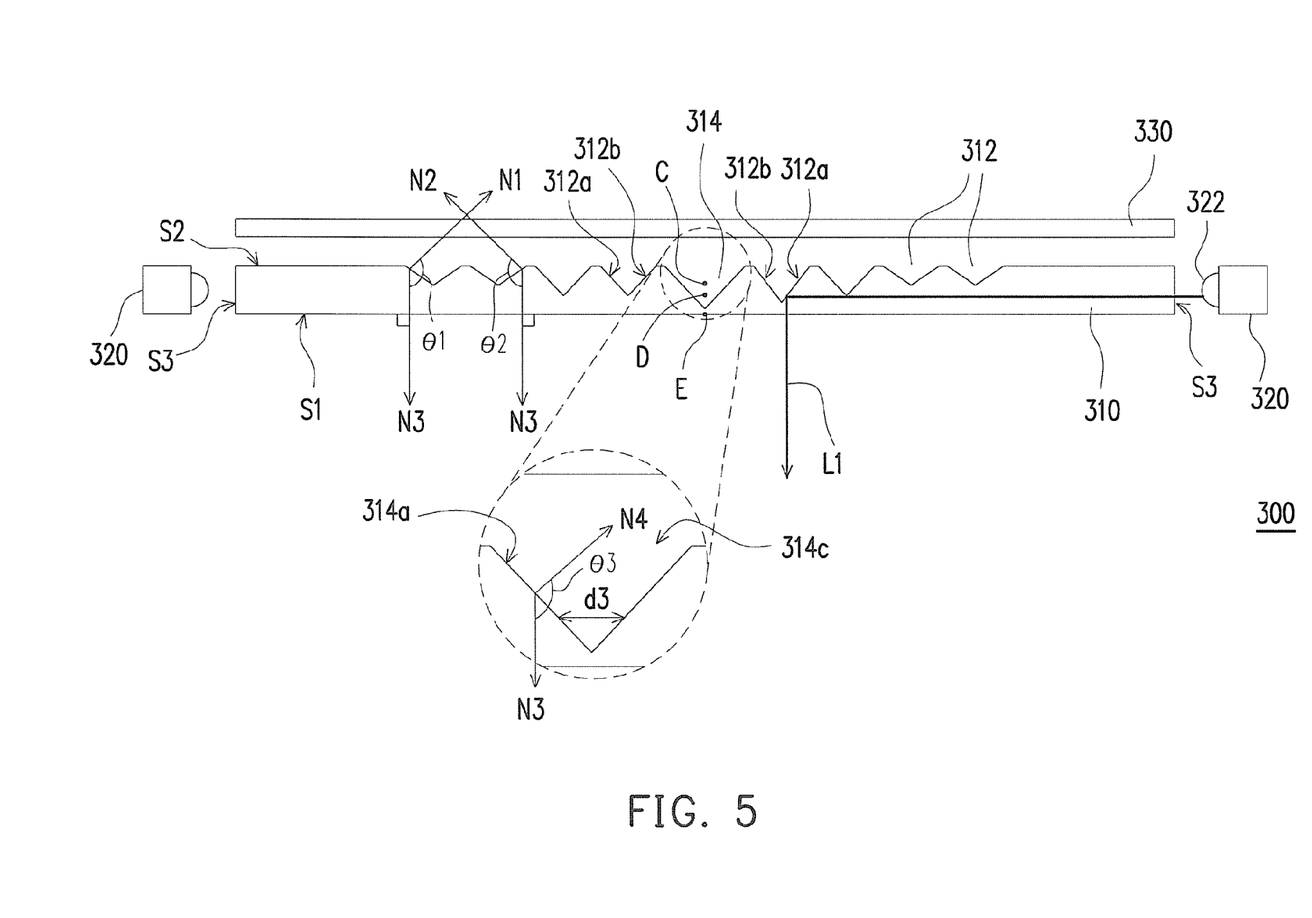
FIG. 5 is a sectional diagram of a light source apparatus according to the third embodiment of the invention.

FIG. 5 is a sectional diagram of a light source apparatus 300 according to the third embodiment of the invention. The light source apparatus 300 is similar to the light source apparatus 100 of FIG. 1A except that the ring-shaped groove 312 of the light source apparatus 300 is a groove with triangle-shaped section, the cavity 314 is a triangle pyramid cavity. In other embodiments, the cavity 314 may also be a cone cavity. Other depiction and modification related to the light source apparatus 300 may refer the first embodiment, which is omitted to describe.

In summary, the embodiments of the invention include at least one of the following advantages or effects. In the embodiments of the invention, since the LGP has a plurality of light incident surfaces and a plurality of ring-shaped grooves, the emitting angle of the light beam may be effectively controlled so as to provide good light-emitting effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light guide plate, comprising:
a first surface;
a second surface, opposite to the first surface, wherein the first surface is a light-emitting surface; and
a plurality of light incident surfaces, connecting the first surface and the second surface,
wherein the second surface has a plurality of ring-shaped grooves, depths of the ring-shaped grooves are gradually decreased from a place close to a center of the light guide plate towards places close to the light incident surfaces, and each of the ring-shaped grooves has:
a first ring-shaped side wall surface; and
a second ring-shaped side wall surface, wherein the second ring-shaped side wall surface is opposite to the first ring-shaped side wall surface, the second ring-shaped side wall surface is located between a geometry center of the ring-shaped groove and the first ring-shaped side wall surface, the first ring-shaped side wall surface is a tilted surface, and an included angle between a normal vector of the first ring-shaped side wall surface and a normal vector of the first surface is greater than 90°.

2. The light guide plate as claimed in claim 1, wherein the second surface further has a cavity, the cavity is surrounded by each of the ring-shaped grooves, the cavity has a ring-shaped side wall surface, the ring-shaped side wall surface is a tilted surface and an included angle between a normal vector of the ring-shaped side wall surface and the normal vector of the first surface is greater than 90°.

3. The light guide plate as claimed in claim 2, wherein orthogonal projections of the geometry center of each of the ring-shaped grooves and a geometry center of the cavity on the first surface are coincided with each other.

4. The light guide plate as claimed in claim 2, wherein the cavity further has a bottom surface, and the bottom surface is located at a place of the geometry center of each of the ring-shaped grooves and connected to the ring-shaped side wall surface.

5. The light guide plate as claimed in claim 4, wherein the cavity is a rod-shaped cavity and an inner diameter of the cavity is ascending from the bottom surface of the cavity towards a top portion of the cavity.

6. The light guide plate as claimed in claim 1, wherein the ring-shaped groove further has a ring-shaped bottom surface connected to the first ring-shaped side wall surface and the second ring-shaped side wall surface.

7. The light guide plate as claimed in claim 1, wherein an included angle between a normal vector of the second ring-shaped side wall surface and the normal vector of the first surface is greater than 90° and an included angle between the normal vector of the second ring-shaped side wall surface and the normal vector of the first ring-shaped side wall surface is greater than 0° and less than 180°.

8. The light guide plate as claimed in claim 1, wherein the ring-shaped groove is a circle ring or a polygon ring.

9. The light guide plate as claimed in claim 1, wherein the included angle between the normal vector of each of the first ring-shaped side wall surface and the normal vector of the first surface is decreased from the places close to the light incident surfaces towards the place close to the center of the light guide plate.

10. The light guide plate as claimed in claim 9, wherein the included angle between the normal vector of the first ring-shaped side wall surface and the normal vector of the first surface is greater than or equal to 130° and is less than or equal to 140°.

11. The light guide plate as claimed in claim 1, wherein an interval is between two adjacent ring-shaped grooves.

12. A light source apparatus, comprising:
a light guide plate, comprising:
a first surface;
a second surface, opposite to the first surface, wherein the first surface is a light-emitting surface; and
a plurality of light incident surfaces, connecting the first surface and the second surface,
wherein the second surface has a plurality of ring-shaped grooves, depths of the ring-shaped grooves are gradually decreased from a place close to a center of the light guide plate towards places close to the light incident surfaces, and each of the ring-shaped grooves has:
a first ring-shaped side wall surface; and
a second ring-shaped side wall surface, wherein the second ring-shaped side wall surface is opposite to the first ring-shaped side wall surface, the second ring-shaped side wall surface is located between a geometry center of the ring-shaped groove and the first ring-shaped side wall surface, the first ring-shaped side wall surface is a tilted surface, and an included angle between a normal vector of the first ring-shaped side wall surface and a normal vector of the first surface is greater than 90°; and
a plurality of light-emitting units, respectively disposed beside the light incident surfaces, wherein each of the light-emitting units is capable of emitting a light beam, the light beams are capable of entering the light guide plate through the light incident surfaces and being transmitted out of the light source apparatus through the first surface.

13. The light source apparatus as claimed in claim 12, wherein the second surface further has a cavity, the cavity is surrounded by each of the ring-shaped grooves, the cavity has a ring-shaped side wall surface, the ring-shaped side wall surface is a tilted surface and an included angle between a normal vector of the ring-shaped side wall surface and the normal vector of the first surface is greater than 90°.

14. The light source apparatus as claimed in claim 13, wherein orthogonal projections of the geometry center of each of the ring-shaped grooves and a geometry center of the cavity on the first surface are coincided with each other.

15. The light source apparatus as claimed in claim 13, wherein the cavity further has a bottom surface, and the bottom surface is located at a place of the geometry center of each of the ring-shaped grooves and connected to the ring-shaped side wall surface.

16. The light source apparatus as claimed in claim 12, wherein the ring-shaped groove further has a ring-shaped bottom surface connected to the first ring-shaped side wall surface and the second ring-shaped side wall surface.

17. The light source apparatus as claimed in claim 12, wherein an included angle between a normal vector of the second ring-shaped side wall surface and the normal vector of the first surface is greater than 90° and an included angle between the normal vector of the second ring-shaped side wall surface and the normal vector of the first ring-shaped side wall surface is greater than 0° and less than 180°.

18. The light source apparatus as claimed in claim 12, wherein the ring-shaped groove is a circle ring or a polygon ring.

19. The light source apparatus as claimed in claim 12, wherein the included angle between the normal vector of each of the first ring-shaped side wall surfaces and the normal vector of the first surface is decreased from the places close to the light incident surfaces towards the place close to the center of the light guide plate.

20. The light source apparatus as claimed in claim 12, wherein the light source apparatus further comprises a reflection sheet disposed on the second surface.

* * * * *